US006763469B1

(12) United States Patent
Daniely (10) Patent No.: US 6,763,469 B1
(45) Date of Patent: Jul. 13, 2004

(54) SYSTEMS FOR LOCAL NETWORK SECURITY

(75) Inventor: Gad Daniely, Zur Yigal (IL)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 09/914,600
(22) PCT Filed: Feb. 17, 2000
(86) PCT No.: PCT/IL00/00098
§ 371 (c)(1),
(2), (4) Date: Aug. 30, 2001
(87) PCT Pub. No.: WO00/52575
PCT Pub. Date: Sep. 8, 2000

(30) Foreign Application Priority Data

Mar. 3, 1999 (IL) .................................................. 128814

(51) Int. Cl.[7] .............................................. G06F 12/14
(52) U.S. Cl. ........................ 713/201; 713/192; 710/40; 710/108; 709/223
(58) Field of Search ................................ 713/200, 201, 713/202, 153, 192, 160, 161, 162; 710/16, 31, 40, 105, 108; 709/223–225, 227

(56) References Cited

U.S. PATENT DOCUMENTS

| 5,204,961 | A | * | 4/1993 | Barlow | 395/725 |
|---|---|---|---|---|---|
| 5,502,766 | A | * | 3/1996 | Boebert et al. | 380/25 |
| 5,606,668 | A | * | 2/1997 | Shwed | 395/200.11 |
| 5,935,245 | A | * | 8/1999 | Sherer | 713/200 |
| 5,968,176 | A | * | 10/1999 | Nessett et al. | 713/201 |
| 6,240,513 | B1 | * | 5/2001 | Friedman et al. | 713/152 |
| 6,304,973 | B1 | * | 10/2001 | Williams | 713/201 |
| 6,356,529 | B1 | * | 3/2002 | Zarom | 370/231 |

* cited by examiner

Primary Examiner—Jeffrey Gaffin
Assistant Examiner—RiJue Mai
(74) Attorney, Agent, or Firm—Mark M. Friedman (57) ABSTRACT

Security systems for computers connected to networks transmitting packets are disclosed. One disclosed system includes a security agent and a local security device featuring a network hardware connector, a computer hardware connector, a flash memory and a microprocessor to perform a software instruction. The security agent closes the security device by altering a setting of a bit of the flash memory. Further disclosed is a firewall on a single chip for providing security to a network transmitting packets. The firewall includes a network hardware connector, a memory for storing a rule and a software instruction for examining each packet and a microprocessor. Preferably the rule is configurable by a user and the memory includes at least one displayable Web and Web server functionally for serving a Web page and accepting a command from a user such that said at least one rule is determined by the command.

51 Claims, 4 Drawing Sheets

SYSTEMS FOR LOCAL NETWORK SECURITY

FIELD AND BACKGROUND OF THE INVENTION

The present invention relates to a system and method for providing local network security, and in particular, to such a system and method in which the security is provided through a hardware device for filtering communications received through the network by an individual computer.

The security of information is extremely important for modern society, particularly since the advent of the Internet. Unauthorized exposure of such information, and/or unintended or unauthorized use of information may significantly damage organizations and individuals. Damage may also be caused by lost, corrupted or misused information. Thus, appropriate security measures are required in order to protect information from such damaging actions, while still maintaining the availability of such information to authorized individuals and/or organizations.

Currently, flexibility and ease of access to information are highly valued, particularly through the Internet and organizational intranets, which provide connections between computers through a network. Accessing information through a network enables users at physically separate locations to share information, but also increases the possibility of unauthorized or unintended access to the information. Various attempts to provide a solution to the problem of security for electronically stored information are known in the art, but all of these attempted solutions have various drawbacks.

For example, a "firewall" is a software program or hardware device which attempts to provide security to an entire network, or to a portion thereof, by filtering all communication which passes through an entry point to the entire network or the portion of the network. Unfortunately, currently available firewalls have a number of disadvantages. The placement of the firewall at the entry point to the network being protected is designed to regulate access to that network. However, since many large organizations have multiple networks, such a firewall may effectively block legitimate access within the organization itself to members of the organization. On the other hand, a firewall cannot protect against unauthorized access within the network by a member of the organization, since the firewall only protects the entry point to the network. Thus, currently available firewalls may both block legitimate access to a network and fail to block unauthorized access to the network.

A more effective solution would regulate access locally for each computer attached to the network, such that each computer would be protected individually, while still permitting centralized control for all of the computers in the network. Such a combination of individual protection and centralized control would solve both of the problems described previously, in that legitimate access within an organization would be permitted, while unauthorized access by a member of the organization could be blocked. Unfortunately, such a solution is not currently available.

There is thus a need for, and it would be useful to have, a system and a method for local security for each computer connected to a network, which would provide individual protection for each computer against unauthorized access and yet which would still permit authorized access within an organization.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

The present invention is of a system and a method for distributed, local network security. Each computer connected to a network is provided with a local security device. The local security devices are configured by a security agent in order to determine filtering rules at each computer. When a user wishes to connect to the network, an authentication procedure is performed with the security agent. If the procedure is successful, then the user receives a set of privileges, or access rules, according to which packets sent by the computer operated by the user are either permitted or denied access to computers connected to the network. Preferably, access is also determined according to different functions of application software programs, such that a user may be permitted to perform only certain functions on a computer connected to the network.

According to other preferred embodiments of the present invention, the user is able to interact with the local security device through one or more Web pages served by the local security device. Also preferably, the local security device is configured as a "firewall on a chip", such that the local security device is implemented as firmware. Additionally, the present invention also provides for a system with multiple security agents, thereby enabling a user to interact with different computers on different sub-networks without requiring different user accounts. Also, the present invention is able to provide virtual private networks, such that computers connected to a physical network can be grouped in different virtual sets without reference to direct physical connections between the computers. Thus, the method and system of the present invention are able to provide flexible network security at the local level.

According to the present invention, there is provided a system for local, distributed security for a computer connected to a network, the network transmitting packets to and from the computer, the system comprising: (a) a local security device for connecting the computer to the network and for examining each packet to determine whether the packet is received by the computer according to at least one rule; and (b) a security agent for determining the at least one rule for the local security device.

According to another embodiment of the present invention, there is provided a firewall on a single chip for providing security to a network, the network transmitting packets, the firewall comprising: (a) a network hardware connector for connecting to the network; (b) a memory for storing at least one rule and for storing at least one software instruction for examining each packet; and (c) a microprocessor for performing the at least one software instruction for examining each packet to determine whether the packet is transmitted according to the at least one rule.

According to yet another embodiment of the present invention, there is provided a method for determining access by a user to a network through a user computer, the network transmitting packets, the method comprising the steps of: (a)

providing a local security device for filtering the packets according to at least one rule, the local security device being connected to the network; (b) receiving an identifier from the user; (c) determining the at least one rule according to the identifier; (d) receiving a packet from the user computer by the local security device; and (e) examining the packet by the local security device to determine whether the packet is given access according to the at least one rule.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system, including operating systems such as Windows CE™ for embedded systems, including cellular telephones, handheld computational devices and palmtop computational devices, and any other computational device which can be connected to a network. Hereinafter, the term "Windows™" includes but is not limited to Windows95™, Windows 3.X™ in which "x" is an integer such as "1", Windows NT™, Windows98™, Windows CE™ and any upgraded versions of these operating systems by Microsoft Inc. (Seattle, Wash., USA).

Hereinafter, the term "user" is the person who operates the GUI interface and interacts with software implemented according to the present invention.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Hereinafter, the term "Web site" refers to at least one Web page, and preferably a plurality of Web pages, virtually connected to form a coherent group. Hereinafter, the term "Web server" refers to a computer or other electronic device which is capable of serving at least one Web page to a Web browser.

The present invention could be described as a series of steps implemented by a data processor, such that the present invention could be implemented as hardware, software or firmware, or a combination thereof For the present invention, a software application could be written in substantially suitable programming language, which could easily be selected by one of ordinary skill in the art. The programming language chosen should be compatible with the computer according to which the software application is executed. Examples of suitable programming languages include, but are not limited to, C, C++ and Java.

DETAILED DESCRIPTION OF THE INVENTION

The present invention is of a system and a method for distributed, local network security. Each computer connected to a network is provided with a local security device.

The local security devices are configured by a security agent in order to determine filtering rules at each computer. When a user wishes to connect to the network, an authentication procedure is performed with the security agent. If the procedure is successful, then the user receives a set of privileges, or access rules, according to which packets sent by the computer operated by the user are either permitted or denied access to computers connected to the network. Preferably, access is also determined according to different functions of application software programs, such that a user may be permitted to perform only certain functions on a computer connected to the network.

According to other preferred embodiments of the present invention, the user is able to interact with the local security device through one or more Web pages served by the local security device. Also preferably, the local security device is configured as a "firewall on a chip", such that the local security device is implemented as firmware. Additionally, the present invention also provides for a system with multiple security agents, thereby enabling a user to interact with different computers on different sub-networks without requiring different user accounts. Also, the present invention is able to provide virtual private networks, such that computers connected to a physical network can be grouped in different virtual sets without reference to direct physical connections between the computers. Thus, the method and system of the present invention are able to provide flexible network security at the local level.

The principles and operation of a method and system according to the present invention may be better understood with reference to the drawings and the accompanying description, it being understood that these drawings are given for illustrative purposes only and are not meant to be limiting.

Figure 1A:
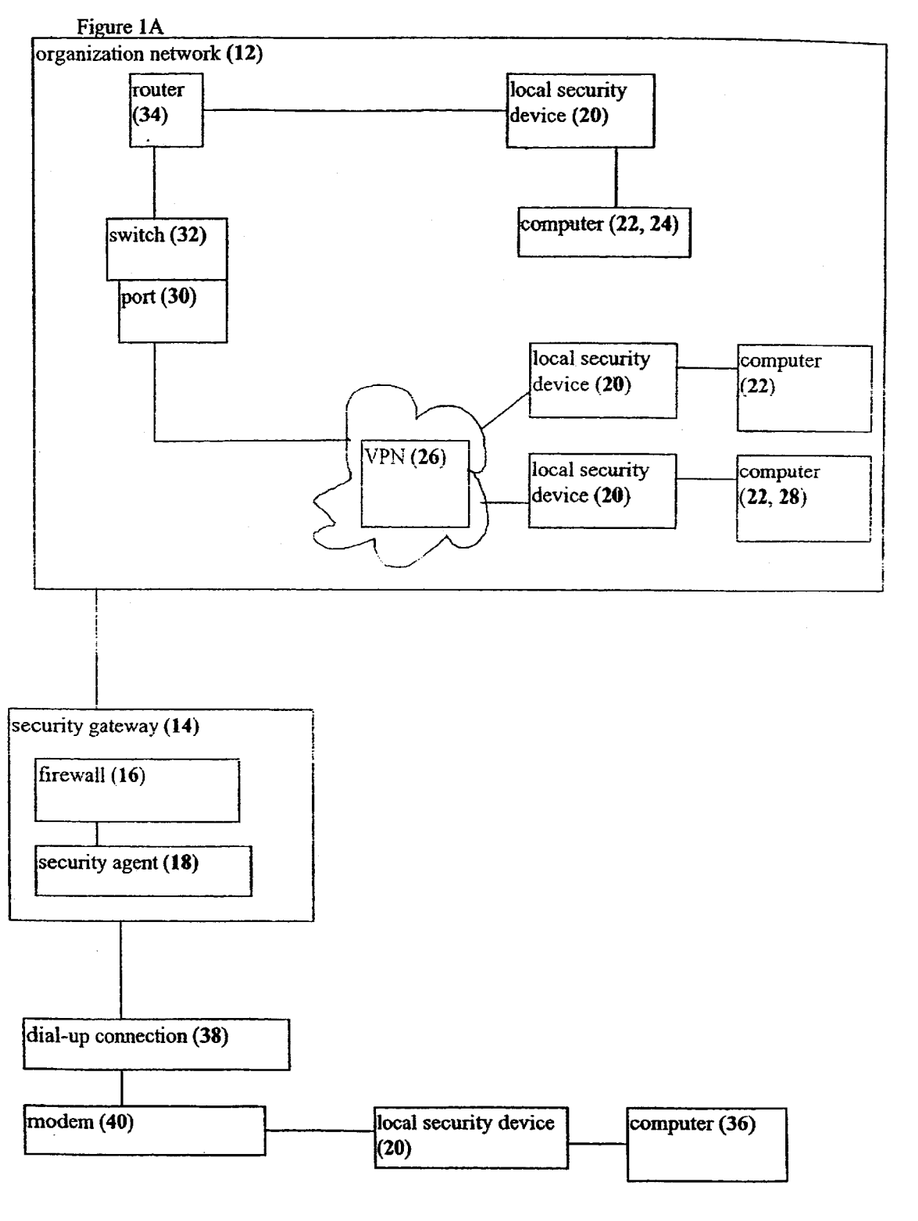
FIGS. 1A and 1B are schematic block diagrams of different embodiments of an illustrative system according to the present invention.
Figure 1B:
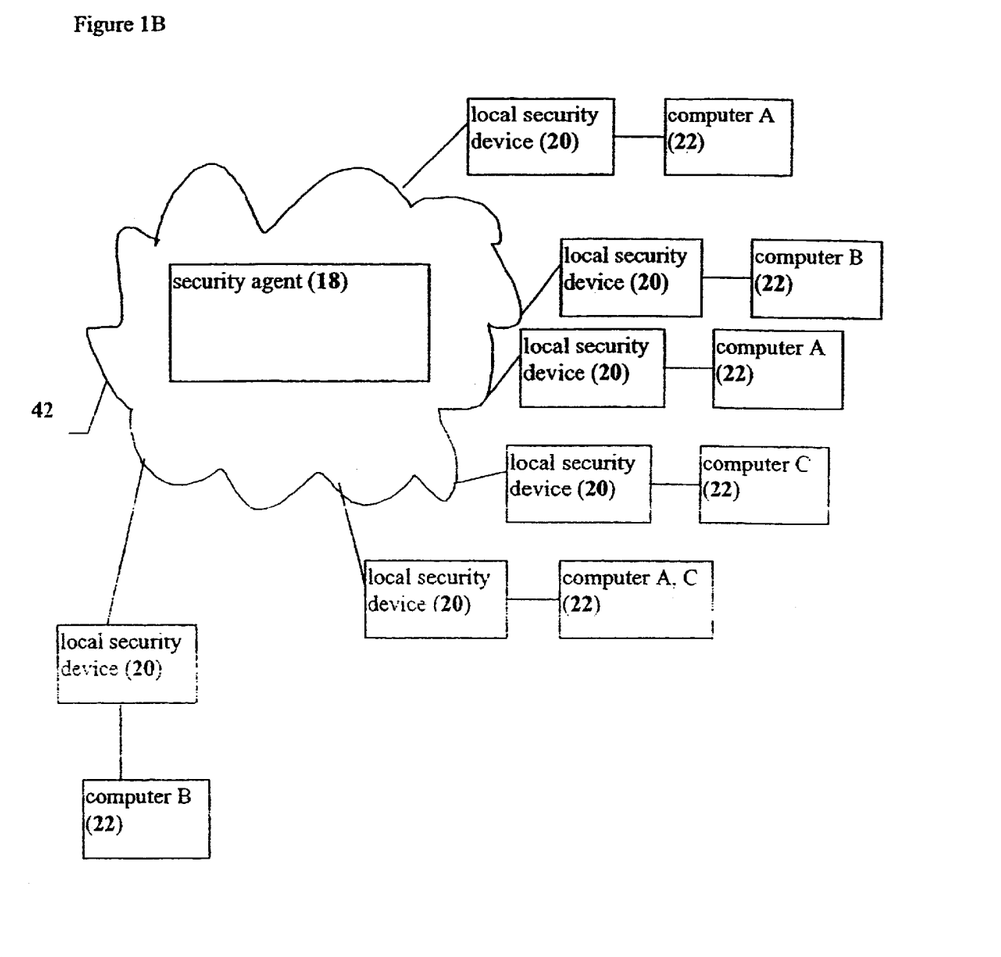

Referring now to the drawings, FIG. 1A is a schematic block diagram of a first exemplary configuration of a system 10 for distributed, local network security according to the present invention, while FIG. 1B is a schematic block diagram of a second exemplary configuration of system 10.

System 10 features an organizational network 12 protected by a security gateway 14. According to the background art, security gateway 14 is a simple firewall, as described for example in U.S. Pat. No. 5,606,668, incorporated by reference as if fully set forth herein as a description of a background art firewall. Such a firewall would filter incoming packets to organizational network 12 in order to determine whether the packets should be allowed to enter. The process of filtering the packet includes the steps of reading the header of the packet, for example in order to determine the MAC or IP layer addresses, and then comparing the information contained within the packet header to a list of rules. Access is either permitted or denied to the packet according to these rules.

According to the present invention, although security gateway 14 may optionally contain a firewall 16 according to the background art, preferably security gateway 14 only contains a security agent 18 according to the present invention. Security agent 18 does not itself filter packets to provide network security. Rather security agent 18 controls at least one, and preferably a plurality of, local security devices 20. Each local security device 20 is connected to a computer 22 as shown. According to a preferred embodiment of the present invention, local security device 20 is implemented as a hardware network interface card, such as an Ethernet card for example. Thus, the heavy computational overhead required by background art firewalls is shifted away from computer 22 and onto local security device 20.

Local security device 20 filters all incoming packets to computer 22 as described above for background art firewalls. The list of rules, or declarations, which are required for filtering the incoming packets is determined at least partially by security agent 18. Optionally and preferably, the declarations are also at least partially determined according to the user operating computer 22. Thus, the security for computer 22 is more preferably controlled both locally, by the user operating computer 22, and centrally, by security agent 18.

The type of filtration of packets provided by local security device 20 for computer 22 is preferably variable according to a number of different characteristics, as known in the art for firewalls. For example, preferably local security device 20 is capable of filtering packets according to both addresses and protocols. Examples of different types of addresses include, but are not limited to, network layer addresses such as IP (internet protocol) addresses, and data link layer addresses such as MAC (machine access control) addresses. A preferred example of a MAC address is an Ethernet address for an Ethernet or Ethernet-compatible network card. By filtering packets according to such an address, local security device 20 determines from which origination address packets are accepted. As described in greater detail below, security agent 18 sends instructions to local security device 20 to determine the originating address or addresses from which packets are accepted. These instructions are intercepted as packets by local security device 20, which is able to determine that the packets are addressed as commands to itself and to follow the commands contained within the packets. Thus, even though each local security device 20 actually filters the packets to be accepted to computer 22, the rules are preferably at least partially determined by security agent 18.

One example of a protocol according to which packets could be filtered is the TCP (transmission control protocol) which is a transport layer protocol. Packets could also optionally be filtered according to other such transport layer protocols, such that particular commands or functions performed by individual software applications can be detected. For example, filtering through TCP enables local security device 20 to permit access to a packet for the "get" command of FTP (file transport protocol) software application but not to the "put" command. Furthermore, optionally local security device 20 could combine information from both the address and the protocol for a packet, such that a user might be permitted to perform a particular command for a software application when sending packets from only one address, for example. Thus, the security rules according to which local security device 20 filters a packet are preferably flexible.

Security agent 18 preferably controls two sets of rules for providing security to each computer 22. As noted previously, the first set of rules is the list of declarations according to which packets are filtered by local security device 20, which is preferably at least partially controlled by the user operating computer 22. The second set of rules is the list of access permissions for each user wishing to gain access to any part of organizational network 12. This set of access permissions is preferably controlled completely by security agent 18, and includes two types of information.

The first type of information concerns the authentication procedure required for a user to access organizational network 12. The user operates computer 22 and enters identification information through a software interface on computer 22. Such identification information includes, but is not limited to, a password, swiping a smart card through a smart card reader attached to computer 22, or any type of biometric information such as a fingerprint, retinal print and so forth. This identification information is then preferably encrypted by local security device 20 and sent to security agent 18. In addition, preferably local security device 20 and security agent 18 exchange secret keys in a handshake procedure. Such a handshake procedure could be any type of procedure which is well known in the art, such as SSL (secure socket layer), RSA, Diffie-Hellman and so forth (R. L. Rivest et al., *Communications of ACM*, 1978, 21:120–126; W. Diffie and M. E. Hellman, *IEEE Transactions of Information Theory*, 22:644–654, 1976). For example, in a bi-directional challenge-response protocol, such as the Kerebos protocol, a series of messages are exchanged between local security device 20 and security agent 18. At least one message in the series with known content is encrypted with a secret key, held by both local security device 20 and security agent 18. The key itself is not transmitted, such that local security device 20 and security agent 18 are able to perform mutual authentication according to their ability to decrypt the message. Thus, preferably both the user operating computer 22 and local security device 20 attached to computer 22 are authenticated during the authentication procedure with security agent 18.

Once security agent 18 has authenticated the user and local security device 20, security agent 18 then determines privileges for the user. These privileges are the access rules for that user, which are preferably sent to local security device 20. The user cannot alter these privileges, thereby preventing an unauthorized user from changing the privileges and becoming a root user in a Unix-based operating system, for example. Thus, preferably only security agent 18 can determine the privileges, or access rules, for each user.

The access rules are preferably also sent to all local security devices 20 attached to computers 22 in organizational network 12, in order to determine whether each local security device 20 should accept a particular packet. For example, a user operating a particular computer 24 may not be permitted access to any computer 22 attached to a virtual private network (VPN) 26. Local security devices 20 connected to all computers 22 of VPN 26 would therefore be configured in order to prevent such access. However, optionally the user operating computer 24 might be permitted access to one computer 28 of VPN 26. Such access to a single computer is possible through the present invention, since security agent 18 would only need to instruct local security device 20 attached to computer 28 to permit access by packets from computer 24. By contrast, background art firewalls would not be able to provide such precise, targeted access, but would instead only be able to filter all access to VPN 26. Thus, the present invention provides both precision and flexibility for determining security of a network, as well as protecting both virtual networks and physical networks.

If the authentication procedure fails for a user operating a particular computer 22 with a particular local security device 20, then preferably security agent 18 directly closes all access through that local security device 20, such that no packets are sent or received through that local security device 20. Optionally, security agent 18 also sends a message to a network administrator, indicating that the authentication process has failed. Preferably, security agent 18 closes access by altering one or more functions of local security device 20, which more preferably includes at least one hardware function, as described in greater detail below for FIG. 3.

FIG. 1A shows another preferred embodiment of the present invention for permitting access to a computer 36 which is physically connected to organizational network 12 through some type of dial-up connection 38. Such access is currently difficult to control in a secure manner through background art security solutions. Indeed, such access is a favored target for "hackers", since these unauthorized users can more easily bypass background art security solutions through either direct dial-up connections, such as modem to modem connections through the POTS telephony network, or through dial-up connections through the Internet. Both of these connections are described herein as "dial-up connections".

According to the present invention, computer 36 is provided with a local security device 20 and a modem 40 for connecting to dial-up connection 38. The user enters the required identification information as previously described. Local security device 20 and security agent 18 then perform the authentication procedure as previously described, with the exception that if the procedure fails, local security device 20 is preferably not closed by security agent 18. Since local security device 20 is completely local to computer 36, the level of protection and security is as strong for computer 36 as for any computer 22 connected to organizational network 12, with the exception that packets may be "sniffed" or intercepted through dial-up connection 38, particularly if dial-up connection 38 includes a connection through the Internet. Such packet interception may be eliminated by providing an encryption software package at local security device 20 which encrypts all packets before they are transmitted through dial-up connection 38. Security agent 18 could then decrypt these packets before they are passed to organizational network 12. Thus, the present invention provides a secure solution for access through a dial-up connection.

According to preferred features of this embodiment, the user is able to alter at least a portion of the rules according to which local security device 20 accepts packets. As noted previously, preferably the user is only able to alter one or more rules locally. More preferably, the user is only able to further restrict the rules according to which packets are accepted, such that these rules become more restrictive. Such a feature is important for connecting to the Internet, for example, which presents a higher degree of security risk than a direct connection to organizational network 12, for example.

In order to permit the user to more easily alter one or more functions of local security device 20 attached to computer 36, preferably local security device 20 provides a GUI (graphical user interface) interface to the user for display on computer 36. More preferably, this GUI is provided as a Web page for display by a Web browser operated by computer 36. The user enters one or more commands through this Web page, for example through a CGI script, which are then transmitted through local security device 20 as though to any different Web address, or URL (uniform resource locator). As described in greater detail below with regard to FIG. 3, local security device 20 is able to intercept this communication by reading the packets during the filtration process. Local security device 20 then configures itself according to the one or more commands entered by the user. Local security device 20 is preferably capable of performing a minimal set of Web server functions, including operating CGI scripts and serving a limited number of Web pages from memory to computer 36. Thus, the user is able to effectively "browse into" local security device 20 itself in order to perform these changes.

FIG. 1B shows one particular embodiment of the present invention, for providing a virtual private network, in more detail. A network 42 is shown as a flat LAN (local area network) for the purposes of illustration only and without intending to be limiting in any way. Network 42 features a plurality of computers 22, each of which is connected to network 42 through a local security device 20. All local security devices 20 are controlled through security agent 18. Security agent 18 configures each local security device 20 in order to provide a plurality of virtual private networks. As shown, all computers 22 labeled with the same letter of the alphabet belong to one virtual private network, such that there are three such virtual private networks: for computers 22 labeled "A", "B" and/or "C". FIG. 1B shows that relative physical location is not important to determine the virtual private network. Furthermore, each computer 22 can belong to more than virtual private network, since one such computer 22 is labeled with both "A" and "C", indicating that it belongs to both the "A" and "C" virtual private networks. Access through each of the virtual private networks is determined according to commands from security agent 18 to local security device 20, such that both the physical location and the type of physical connection between computers 22 is not important.

Figure 2:
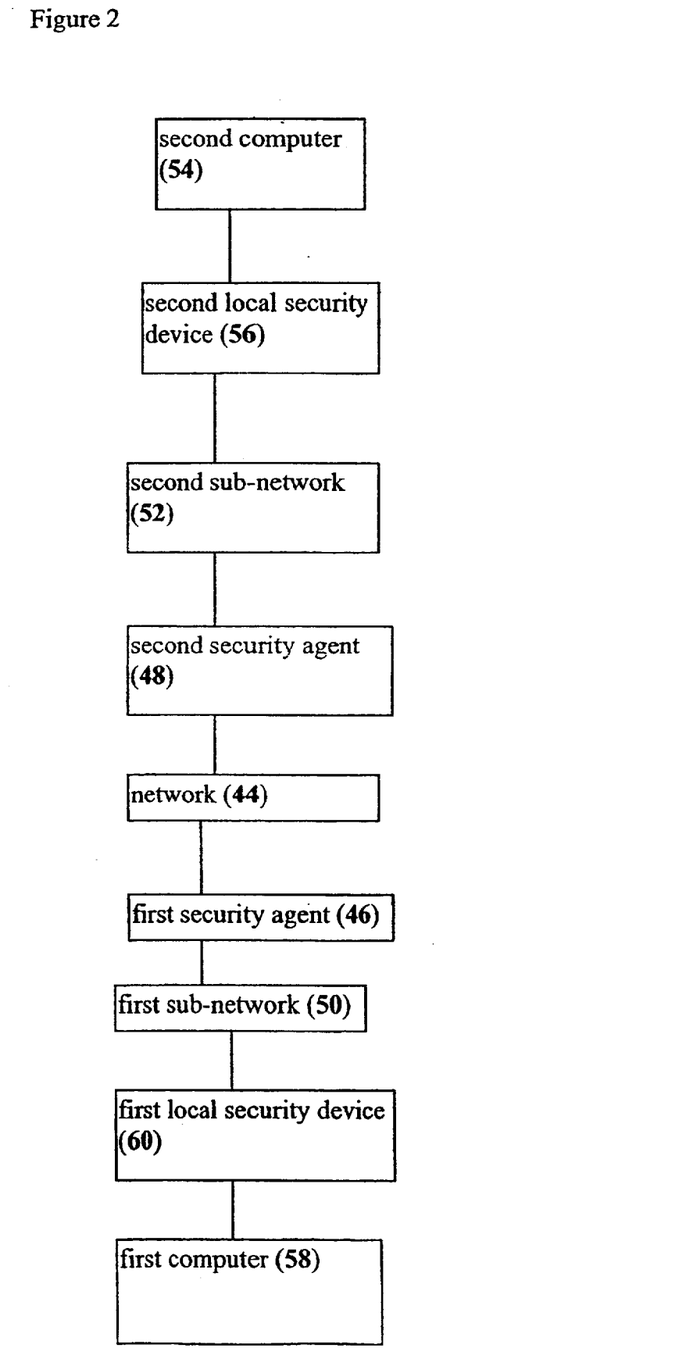
FIG. 2 is a schematic block diagram of an illustrative system with multiple security agents according to the present invention.

FIG. 2 shows yet another embodiment of the present invention with multiple security agents. A portion of a network 44 is shown for the purposes of illustration only and without intending to be limiting in any way. Network 44 features a first security agent 46 and a second security agent 48, which are otherwise similar to security agent 18 described previously. Network 44 includes a first sub-network 50, through which access is determined by first security agent 46; and a second sub-network 52, through which access is determined by first security agent 48. A first computer 54 is connected to first sub-network 50 through a first local security device 56. Similarly, a second computer 58 is connected to second sub-network 52 through a second local security device 60.

The embodiment shown in FIG. 2 solves a particular problem of background art firewalls. These background art firewalls require the user to access the organizational network through a computer within the network protected by the firewall. If the user wishes to access the organizational network through a different sub-network which is outside of this firewall, for example through a different physical location, the user is required to log-in through a different user account. Requiring different user accounts is both complicated and tedious to administer, and may also lead to further weaknesses in the security system.

By contrast, the embodiment of FIG. 2 enables the user to log-in to network 44 through a plurality of different sub-networks with a single user account. If the user normally accesses network 44 through first sub-network 50, for example, then the user privileges are stored by first security agent 46. If the user then attempts to access network 44 through second sub-network 52, then second security agent 48 queries first security agent 46 with the identification information of the user. First security agent 46 then responds with the user privileges for that user. Thus, the user is able to access network 44 without requiring a separate user account for each sub-network, since the security agents automatically query each other in order to determine the user privileges.

Figure 3:
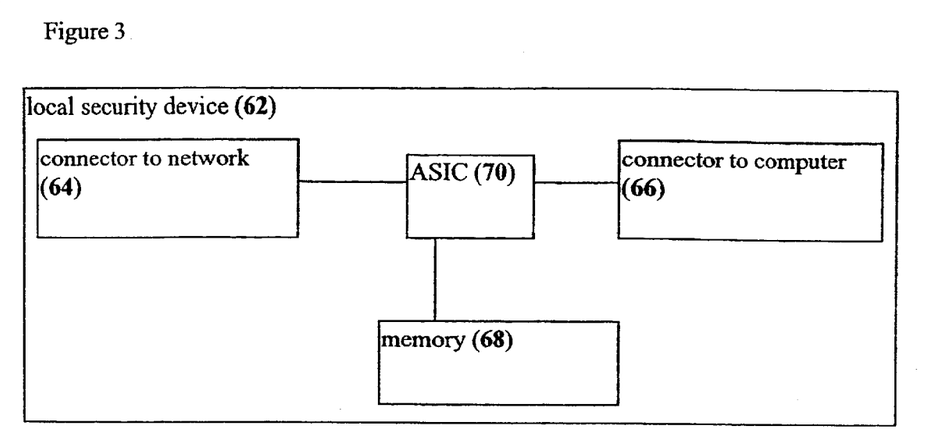
FIG. 3 is a schematic block diagram of an exemplary local security device according to the present invention.

FIG. 3 shows a particularly preferred embodiment of a local security device according to the present invention. Although the local security device of the present invention can be implemented as hardware, firmware, software or a combination thereof, preferably the present invention is implemented as firmware. As shown, a local security device 62 includes a physical network access component 64 for accessing the network. Physical network access component 64 could be substantially any type of hardware network connector, including a network card such as an Ethernet card, determined according to the network itself and which could easily be selected by one of ordinary skill in the art. In addition, local security device 62 includes a physical computer hardware connector 66 for connection to the local computer, which is preferably compatible with the hardware slot intended for a network card.

Local security device 62 features a read/write memory 68 for storing filtering rules from the security agent, as well as software instructions for performing the filtering of the packets. Preferably, memory 68 is a permanent memory, such as a flash memory for example. More preferably, memory 68 also stores the limited set of Web server functionalities as described for FIG. 1A and the Web pages served to the local computer. Memory 68 is connected to a microprocessor, preferably contained in an ASIC (application specific integrated circuit) 70. ASIC 70 would then perform the instructions stored in memory 68 for filtering the packets and for performing the other functions according to the present invention. ASIC 70 is more preferably integrated with memory 68 to form a single chip. An integrated flash memory and ASIC chip is available from Samsung, Inc. for example (Taeju, Korea). Such a firmware embodiment is particularly preferable for local security device 62 since all of the computations required to implement the firewall are performed by local security device 62 rather than by the local computer itself, thereby reducing the, computational load on the local computer.

For this embodiment of the local security device, the security agent could close all access to local security device 62, if the authentication process fails for example, as follows. The security agent could send a command to local security device 62 which would set a bit in memory 68 as "off". Since such a setting is a hardware setting, it could not be erased. No access would then be permitted through local security device 62 until the security agent reset the bit of memory 68 to "on".

This embodiment of the present invention could also be separately implemented as a "firewall on a chip", with ASIC 70 and memory 68 integrated on a single chip. This implementation would preferably include the Web server functionalities for serving one or more Web pages to the Web browser of the user, and for receiving one or more commands from the user, as previously described. Thus, even though the firewall would be implemented as firmware, it could easily be configured through these Web page(s).

It will be appreciated that the above descriptions are intended only to serve as examples, and that many other embodiments are possible within the spirit and the scope of the present invention.

What is claimed is:

1. A system for local, distributed security for a computer connected to a network, the network transmitting packets to and from the computer, the system comprising:
   (a) a local security device for connecting the computer to the network and for examining each packet to determine whether said packet is received by the computer according to at least one rule; and
   (b) a security agent for determining said at least one rule for said local security device;
      wherein said local security device includes:
         (i) a network hardware connector for connecting to the network;
         (ii) a computer hardware connector for connecting to the computer;
         (iii) a flash memory for storing said at least one rule and for storing at least one software instruction for examining each packet; and
         (iv) a microprocessor for performing said at least one software instruction;
   and wherein said security agent closes said local security device by altering a setting of a bit of said flash memory.

2. The system of claim 1, wherein said microprocessor is contained within an ASIC (application specific integrated chip), and said ASIC and said flash memory are integrated in a single chip.

3. The system of claim 1, wherein said at least one rule determines whether said packet is received by the computer according to an address of said packet.

4. The system of claim 3, wherein said address is selected from the group consisting of a link layer address and a network layer address.

5. The system of claim 4, wherein said address is selected from the group consisting of a MAC address and an IP address.

6. The system of claim 3, wherein said at least one rule determines whether said packet is received by the computer according to a protocol of said packet.

7. The system of claim 1, further comprising:
   (d) a dial-up connection for connecting to the network; and
   (e) a modem for connecting said local security device to said dial-up connection, such that the computer connects to the network through said dial-up connection.

8. The system of claim 7, wherein said at least one rule is a plurality of rules, including at least one user-configurable rule for determining access by a packet to the computer of the user.

9. A system for local, distributed security for a computer connected to a network, the network transmitting packets to and from the computer, the system comprising:
   (a) a local security device for connecting the computer to the network and for examining each packet to determine whether said packet is received by the computer according to at least one rule;
   (b) a security agent for determining said at least one rule for said local security device; and
   (c) a second local security device for sending and receiving packets;
   wherein the computer is operated by a user, and said user sends an identifier to said security agent through the computer to determine said at least one rule for said second local security device, such that said security agent determines said at least one rule for said second local security device according to said identifier of said user;
   (d) a dial-up connection for connecting to the network; and
   (e) a modem for connecting said local security device to said dial-up connection, such that the computer connects to the network through said dial-up connection;
      wherein said at least one rule is a plurality of rules, including at least one user-configurable rule for determining access by a packet to the computer of the user; and
      wherein the computer of the user operates a Web browser and said local security device further includes:
         (i) at least one Web page for being displayed by said Web browser; and
         (ii) at least a portion of a set of Web server functionalities for serving said at least one Web page and for accepting at least one command from said user through said at least one Web page, such that said at least one user-configurable rule is determined according to said at least one command.

10. A system for local, distributed security for a computer connected to a network, the network transmitting packets to and from the computer, the system comprising:
  (a) a local security device for connecting the computer to the network and for examining each packet to determine whether said packet is received by the computer according to at least one rule; and
  (b) a security agent for determining said at least one rule for said local security device.
  (c) a second local security device for sending and receiving packets;
wherein the computer is operated by a user, and said user sends an identifier to said security agent through the computer to determine said at least one rule for said second local security device, such that said security agent determines said at least one rule for said second local security device according to said identifier of said user; and
  (d) a second computer connected to said second local security device;
wherein said second local security device is configured according to said at least one rule to accept a packet from the computer of the user, such that the computer of the user and said second computer are connected in a virtual private network.

11. The system of claim 10, wherein said local security device includes:
  (i) a network hardware connector for connecting to the network;
  (ii) a computer hardware connector for connecting to the computer;
  (iii) a memory for storing said at least one rule and for storing at least one software instruction for examining each packet; and
  (iv) a microprocessor for performing said at least one software instruction.

12. The system of claim 11, wherein said memory is a flash memory.

13. The system of claim 12, wherein said microprocessor is contained within an ASIC (application specific integrated chip), and said ASIC and said flash memory are integrated in a single chip.

14. The system of claim 11, wherein said at least one rule determines whether said packet is received by the computer according to an address of said packet.

15. The system of claim 14, wherein said address is selected from the group consisting of a link layer address and a network layer address.

16. The system of claim 15, wherein said address is selected from the group consisting of a MAC address and an IP address.

17. The system of claim 14, wherein said at least one rule determines whether said packet is received by the computer according to a protocol of said packet.

18. The system of claim 10, wherein said user sends said identifier to said security agent during an authentication procedure, such that said security agent determines said at least one rule only if said authentication procedure succeeds.

19. The system of claim 18, wherein if said authentication procedure fails, said security agent closes said local security device to prevent further transmission of packets.

20. The system of claim 10, further comprising:
  (e) a dial-up connection for connecting to the network; and
  (f) a modem for connecting said local security device to said dial-up connection, such that the computer connects to the network through said dial-up connection.

21. The system of claim 20, wherein said at least one rule is a plurality of rules, including at least one user-configurable rule for determining access by a packet to the computer of the user.

22. The system of claim 21, wherein the computer of the user operates a Web browser and said local security device further includes:
  (i) at least one Web page for being displayed by said Web browser; and
  (ii) at least a portion of a set of Web server functionalities for serving said at least one Web page and for accepting at least one command from said user through said at least one Web page, such that said at least one user-configurable rule is determined according to said at least one command.

23. A system for local, distributed security for a computer connected to a network, the network transmitting packets to and from the computer, the system comprising:
  (a) a local security device for connecting the computer to the network and for examining each packet to determine whether said packet is received by the computer according to at least one rule; and
  (b) a security agent for determining said at least one rule for said local security device:
    wherein a user has at least one access privilege stored on said security agent, the system further comprising:
  (c) a second network for transmitting packets;
  (d) a second computer for connecting to said second network;
  (e) a second local security device for connecting said second computer to said second network and for determining access for each packet to said second computer according to at least one rule; and
  (f) a second security agent for controlling said second local security device by determining said at least one rule, such that when said user accesses said second network through said second local security device, said second security agent receives said at least one rule from said security agent.

24. The system of claim 23, wherein said local security device includes:
  (i) a network hardware connector for connecting to the network;
  (ii) a computer hardware connector for connecting to the computer;
  (iii) a memory for storing said at least one rule and for storing at least one software instruction for examining each packet; and
  (iv) a microprocessor for performing said at least one software instruction.

25. The system of claim 24, wherein said memory is a flash memory.

26. The system of claim 25, wherein said microprocessor is contained within an ASIC (application specific integrated chip), and said ASIC and said flash memory are integrated in a single chip.

27. The system of claim 23, wherein said at least one rule determines whether said packet is received by the computer according to an address of said packet.

28. The system of claim 27, wherein said address is selected from the group consisting of a link layer address and a network layer address.

29. The system of claim 28, wherein said address is selected from the group consisting of a MAC address and an IP address.

30. The system of claim 27, wherein said at least one rule determines whether said packet is received by the computer according to a protocol of said packet.

31. The system of claim 23, wherein said user sends said identifier to said security agent during an authentication procedure, such that said security agent determines said at least one rule only if said authentication procedure succeeds.

32. The system of claim 31, wherein if said authentication procedure fails, said security agent closes said local security device to prevent further transmission of packets.

33. The system of claim 23, further comprising:
(g) a dial-up connection for connecting to the network; and
(g) a modem for connecting said local security device to said dial-up connection, such that the computer connects to the network through said dial-up connection.

34. The system of claim 33, wherein said at least one rule is a plurality of rules, including at least one user-configurable rule for determining access by a packet to the computer of the user.

35. The system of claim 34, wherein the computer of the user operates a Web browser and said local security device further includes:
(i) at least one Web page for being displayed by said Web browser; and
(ii) at least a portion of a set of Web server functionalities for serving said at least one Web page and for accepting at least one command from said user.

36. A firewall on a single chip for providing security to a network, the network transmitting packets, the firewall comprising:
(a) a network hardware connector for connecting to the network;
(b) a memory for storing at least one rule and for storing at least one software instruction for examining each packet; and
(c) a microprocessor for performing said at least one software instruction for examining each packet to determine whether said packet is transmitted according to said at least one rule;
wherein said at least one rule is configurable by a user and said memory includes:
(i) at least one Web page for being displayed to said user; and
(ii) at least a portion of a set of Web server functionalities for serving said at least one Web page and for accepting at least one command from said user through said at least one Web page, such that said at least one rule is determined according to said at least one command.

37. The firewall of claim 36, wherein said memory is a flash memory.

38. The firewall of claim 37, wherein said microprocessor is contained within an ASIC (application specific integrated chip).

39. The firewall of claim 36, further comprising:
(d) a further local security device for sending and receiving packets;
wherein the computer is operated by a user, and said user sends an identifier to said security agent through the computer to determine said at least one rule for said second local security device, such that said security agent determines said at least one rule for said second local security device according to said identifier of said user.

40. The system of claim 39, further comprising:
(e) a further computer connected to said further local security device;
wherein said further local security device is configured according to said at least one rule to accept a packet from the computer of the user, such that the computer of the user and said further computer are connected in a virtual private network.

41. A system for local, distributed security for a computer connected to a network, the network transmitting packets to and from the computer, the system comprising:
(a) a local security device for connecting the computer to the network and for examining each packet to determine whether said packet is received by the computer according to at least one rule; and
(b) a security agent for determining said at least one rule for said local security device; and
(c) a second local security device for sending and receiving packets;
wherein the computer is operated by a user, and said user sends an identifier to said security agent through the computer to determine said at least one rule for said second local security device, such that said security agent determines said at least one rule for said second local security device according to said identifier of said user;
wherein said user sends said identifier to said security agent during an authentication procedure, such that said security determines said at least one rule only if said authentication procedure succeeds;
wherein if said authentication procedure fails, said security agent closes said local security device to prevent further transmission of packets; and
wherein said security agent closes said local security device by altering a setting of a bit of said flash memory.

42. The system of claim 41, wherein said local security device includes:
(i) a network hardware connector for connecting to the network;
(ii) a computer hardware connector for connecting to the computer; and
(iii) a microprocessor for performing said at least one software instruction.

43. The system of claim 42, wherein said microprocessor is contained within an ASIC (application specific integrated chip), and said ASIC and said flash memory are integrated in a single chip.

44. The system of claim 41, wherein said at least one rule determines whether said packet is received by the computer according to an address of said packet.

45. The system of claim 44, wherein said address is selected from the group consisting of a link layer address and a network layer address.

46. The system of claim 45, wherein said address is selected from the group consisting of a MAC address and an IP address.

47. The system of claim 44, wherein said at least one rule determines whether said packet is received by the computer according to a protocol of said packet.

48. The system of claim 41, further comprising:
(d) a dial-up connection for connecting to the network; and
(e) a modem for connecting said local security device to said dial-up connection, such that the computer connects to the network through said dial-up connection.

49. The system of claim 48, wherein said at least one rule is a plurality of rules, including at least one user-configurable rule for determining access by a packet to the computer of the user.

50. The system of claim 49, wherein the computer of the user operates a Web browser and said local security device further includes:
  (i) at least one Web page for being displayed by said Web browser; and
  (ii) at least a portion of a set of Web server functionalities for serving said at least one Web page and for accepting at least one command from said user through said at least one Web page, such that said at least one user-configurable rule is determined according to said at least one command.

51. The system of claim 41, further comprising
  (d) a second computer connected to said second local security device;
wherein said second local security device is configured according to said at least one rule to accept a packet from the computer of the user, such that the computer of the user and said second computer are connected in a virtual private network.

* * * * *